United States Patent [19]

Ickinger et al.

[11] Patent Number: 4,729,836

[45] Date of Patent: Mar. 8, 1988

[54] FLEXIBLE CHICANE SYSTEM FOR LIQUID-SOLID SEPARATION EQUIPMENT

[75] Inventors: Georg Ickinger, Graz, Austria; Siegfried Hausegger, Arlington, Tex.

[73] Assignee: Arus Andritz-Ruthner, Inc., Pittsburgh, Pa.

[21] Appl. No.: 936,306

[22] Filed: Dec. 1, 1986

[51] Int. Cl.[4] .............................................. B01D 33/04
[52] U.S. Cl. .................................. 210/783; 210/396; 210/400
[58] Field of Search ............... 210/386, 396, 400, 401, 210/783, 791, 797; 209/264, 267, 272, 385; 172/705, 711, 721, 724, 730, 734, 747, 754, 755, 758, 760, 765, 771; 111/7, 86; 134/9, 15

[56] References Cited

U.S. PATENT DOCUMENTS

| 377,980 | 2/1888 | Bateman . |
| 390,168 | 9/1888 | Harthan . |
| 472,848 | 4/1892 | Bartlett et al. . |
| 506,880 | 10/1893 | Jewell . |
| 712,347 | 10/1902 | Wheelwright . |
| 965,486 | 7/1910 | Putt . |
| 966,862 | 8/1910 | Ruffin . |
| 1,207,262 | 12/1916 | Alwart . |
| 1,332,938 | 3/1920 | Wadsworth . |
| 1,358,880 | 11/1920 | Rodriquez . |
| 1,408,279 | 2/1922 | Ewald . |
| 1,432,738 | 10/1922 | Alwart . |
| 1,457,810 | 6/1923 | Alwart . |
| 1,666,161 | 4/1928 | Birdsey . |
| 1,682,460 | 8/1928 | Aldrich . |
| 1,789,425 | 1/1931 | Cabrera . |
| 1,875,442 | 9/1932 | Greg . |
| 1,958,279 | 5/1934 | Morgan . |
| 2,097,529 | 11/1937 | Nordell . |
| 2,308,264 | 1/1943 | Bolton . |
| 2,314,542 | 3/1943 | Kern . |

(List continued on next page.)

FOREIGN PATENT DOCUMENTS

| 21258 | 1/1936 | Australia .............................. 172/724 |
| 38879 | 9/1909 | Austria . |
| 41297 | 12/1929 | Denmark . |
| 579288 | 6/1933 | Fed. Rep. of Germany . |
| 911369 | 5/1954 | Fed. Rep. of Germany . |
| 1143790 | 2/1963 | Fed. Rep. of Germany . |
| 1575879 | 7/1969 | France . |
| 2180049 | 11/1973 | France . |
| 64098 | 12/1928 | Sweden . |
| 79786 | 3/1934 | Sweden . |
| 88565 | 12/1937 | Sweden . |
| 491735 | 9/1932 | United Kingdom . |
| 772851 | 4/1957 | United Kingdom . |
| 1145135 | 3/1969 | United Kingdom . |
| 1598130 | 9/1981 | United Kingdom . |
| 499941 | 3/1976 | U.S.S.R. . |
| 521907 | 9/1976 | U.S.S.R. . |
| 856939 | 11/1979 | U.S.S.R. . |

OTHER PUBLICATIONS

Nedag brochure entitled "Plane Filters".
Japanese Patent Application Publication SHO 29-4138/1954 Publication Date: Jul. 8, 1954

Primary Examiner—Richard V. Fisher
Assistant Examiner—Richard D. Jordan
Attorney, Agent, or Firm—Roylance, Abrams, Berdo & Goodman

[57] ABSTRACT

A chicane system is provided in a belt filter press in a gravity drainage zone. The gravity drainage zone includes a movable filter belt, an inlet for distributing a suspension on the filter belt and an outlet for discharging separated liquid and solid components of the suspension. A support rod is mounted over the filter belt and has a longitudinal axis generally perpendicular to the filter belt movement. A plurality of flow turners depend from the support rod and engage the filter belt to prevent clogging of the filter belt by the suspension solid component. Each flow turner includes a plow portion extending into the suspension and engaging the filter belt and a leaf spring portion fixed at one end to the support rod and at an opposite end to the plow portion. Each leaf spring portion is stressed to bias and force its plow portion against the filter belt.

39 Claims, 17 Drawing Figures

U.S. PATENT DOCUMENTS

| | | | |
|---|---|---|---|
| 2,389,650 | 11/1945 | Stephens . | |
| 2,395,089 | 2/1946 | Arelt . | |
| 2,848,113 | 8/1958 | Paterson et al. . | |
| 2,895,614 | 7/1959 | Komline . | |
| 3,180,432 | 4/1965 | Bertelsen | 172/755 |
| 3,420,239 | 1/1969 | Lorenzen . | |
| 3,446,139 | 5/1969 | Coffelt . | |
| 3,485,377 | 12/1969 | McKenzie et al. . | |
| 3,520,410 | 7/1970 | Hutto, Jr. . | |
| 3,531,404 | 9/1970 | Goodman et al. . | |
| 3,536,146 | 10/1970 | Groenke . | |
| 3,601,039 | 8/1971 | Schover . | |
| 3,743,100 | 7/1973 | Bahr . | |
| 3,774,760 | 11/1973 | Beristain et al. . | |
| 3,865,232 | 2/1975 | Koenig et al. . | |
| 3,873,450 | 3/1975 | Lovegreen . | |
| 3,891,549 | 6/1975 | Carmel et al. . | |
| 3,896,030 | 7/1975 | Bahr . | |
| 3,950,562 | 4/1976 | Senior . | |
| 3,984,329 | 10/1976 | Wenzel et al. . | |
| 4,078,615 | 3/1978 | Kelley | 172/711 |
| 4,079,010 | 3/1978 | Killeen et al. . | |
| 4,115,275 | 9/1978 | Morris . | |
| 4,142,971 | 3/1979 | Le Fur et al. . | |
| 4,164,597 | 8/1979 | Smith . | |
| 4,185,699 | 1/1980 | Lewison | 172/724 |
| 4,186,090 | 1/1980 | van Oosten . | |
| 4,276,168 | 6/1981 | Bastgen . | |
| 4,305,822 | 12/1981 | Eimer et al. . | |
| 4,354,935 | 10/1982 | Austin et al. | 210/396 |
| 4,367,601 | 1/1983 | Latimer et al. . | |
| 4,459,530 | 6/1984 | Eustacchio et al. . | |
| 4,466,492 | 8/1984 | Steinberg | 172/711 |
| 4,574,502 | 3/1986 | Blau | 172/747 |
| 4,602,998 | 6/1986 | Goron | 210/396 |
| 4,609,467 | 9/1986 | Morales . | |

FLEXIBLE CHICANE SYSTEM FOR LIQUID-SOLID SEPARATION EQUIPMENT

FIELD OF THE INVENTION

The present invention relates to a flexible chicane system for a belt filter, belt filter press or similar liquid-solid separation equipment having a plurality of resilient flow turners or plows which extend into the suspension or slurry conveyed on a filter belt and engage the filter belt. The flow turners prevent clogging of the filter belt by the solid component of the suspension and enhance drainage of free liquid through the suspension and filter belt by turning the solid components over in a generally helical configuration and generating filter belt areas cleared of solid components. The resilient flow turners are biased against the belt to engage positively the filter belt, while permitting movement with and relative to the belt in response to suspension flow and belt conditions.

BACKGROUND OF THE INVENTION

In the handling of suspensions or slurries, particularly sewage sludge or other flocculated or unflocculated slurries, it is often necessary to separate the liquid from the solid component of the suspension. For effective liquid-solid separation, devices such as belt filters and belt filter presses are employed.

A suspension is deposited on one end of a belt filter in an area of an apparatus commonly referred to as the "gravity drainage zone" or "gravity section". The belt can be supported by rollers or by perforated plates. Devices enhancing drainage or flow breaker devices are employed to enhance dewatering in the gravity section. Typical arrangements on a nominal two meter sized unit involve approximately ten rows of devices with about eight or nine devices per row. This ensures that all of the sludge in the gravity drainage zone contacts the devices for achieving maximum drainage of free water.

Without devices enchancing drainage or flow breakers, the solid component of the suspension may settle on the belt such that water can not pass by gravity through the belt. The stratified liquid and solid components then exit the zone without being effectively separated. Flow deflectors or similar devices are disclosed in U.S. Pat. No. 4,456,530 to Eustacchio et al, 3,984,329 to Wenzel et al, 4,602,998 to Goron and 4,609,467 to Morales.

By use of suitable flow breakers, the slurry blanket is split and the solid component is pushed aside exposing filter media cleared of slurry or solid material. With the devices enhancing drainage or flow breakers engaging the belt directly, openings generated within the solid component expose the belt to the free water and enable the free water to pass through the belt for collection below the filter belt. The solid component is then separately collected and discharged at an end of the filter belt opposite its inlet for downstream dewatering operations.

The systems disclosed in some of the above cited patents employ rigid upright elongated members of generally cylindrical or wedge shape as flow breakers for breaking or splitting the slurry and fail to provide adjustable pressure of the flow breakers against the belt. The conveyor flow breakers must be lifted, raised or pivoted out of the slurry for cleaning, interrupting operation. Additionally, the conventional flow breakers interrupt or deflect the slurry flow, rather than gently turn the slurry upside down. Due to the use of hard, non-flexing materials, the conventional flow breakers tend to abrade and to damage the belt.

As the slurry becomes denser and more viscous during the dewatering process on a gravity section, the upward force against the flow breakers generated by the solid component carried by the travelling belt increases in the direction of belt travel. The flow breakers will require increasing downward forces in the flow direction from one row to the next to maintain contact with the filter belt, and thus, assure maximum effectiveness.

With conventional flow breakers the downward force is predetermined by the weight of the flow breaker turning freely about its pivot axis or present by a locking mechanism. The downward force exerted by the flow breaker cannot be adjusted during operation. Furthermore, the downward force on individual flow breakers or rows of flow breakers is the same regardless of their position. Thus, conventional flow breakers are designed and perform at their best for only one operating condition and cannot be adjusted to the varying operating conditions existing on the gravity section of a belt filter or belt filter press. At locations spaced from this optimum operating point, the downward force will be either too high, resulting in accelerated wear of flow breaker and filter belt, or too low, resulting in poor performance of the flow breaker by being pushed out of the more dense slurry.

SUMMARY OF THE INVENTION

It has now been discovered that the disadvantages associated with conventional chicane systems for belt filters and belt filter presses can be eliminated by flow turners that depend from a support rod, which is mounted above the filter belt and is transverse to the filter belt movement, and which prevents clogging of the filter belt and flow turner by the solid component of the suspension being dewatered. Each flow turner includes a plow portion adapted to extend into the suspension and engage the filter belt, and a leaf spring portion attaching the plow portion to the support rod. The leaf spring portion is fixed at one end to the support rod and at an opposite end to the plow portion. Each leaf spring is stressed to bias and force the respective plow portion against the filter belt.

In this manner, each plow portion is resiliently biased against the filter belt. The resiliency (i.e., the ability of a strained body to recover its size and shape after deformation caused by stress) of the leaf spring portion and plow portion permits the plow portion to move upwardly, downwardly or sideways maintaining contact with the filter belt with the desired force. Since the plow portion can move vertically and laterally, undue stresses are not exerted against the filter belt avoiding damage to the filter belt. Since a force is maintained by the plow portion against the filter belt, improved belt cleaning action is realized, thereby enhancing the liquid-solid separation.

To effectively engage the filter belt without damaging it, the plow or flow turners accommodate the irregularities in the belt, while maintaining adequate pressure and essentially continuous contact against the belt. Additionally, the position and pressure exerted by the turners can be adjustable during operation, depending on slurry conditions such as thickness, weight, viscosity and density. In the conventional flow breakers, the downward force can only be adjusted by varying the weight of the individual plows, and cannot be adjusted during operation.

The flow turner design is insensitive to the build up of fibers, solids and other forms of debris commonly found in sludge. If build up or plugging is inevitable, the flow turner design prevents the flow turners from lifting or pivoting out of the sludge blanket for cleaning. If large foreign objects, such as tools dropped by workmen, enter the gravity section and the conventional flow breakers are lifted by the object permitting the large object to pass the flow breakers and enter downstream areas of the equipment, damage to filter belts and other components would be caused.

The flow turners are cleaned by moving their plow portions upstream against the sludge flow, and then releasing them and returning them to their initial position. The flow turners are moved upstream by rotating the support rod such that the leaf spring portion is wrapped further about the support rod pulling the plow portion upstream. By repeating this movement several times, material built up on the flow turners will be loosened and will flow downstream. In this manner the flow turners can be cleaned without the flow turners being lifted out of the slurry flow and interrupting the flow turner action.

Preferably, each plow portion is formed as a unitary, one-piece structure with its leaf spring portion, and preferably, is unitarily molded of flexible synthetic plastic such as rubber and specialty plastic, most preferably polyurethane. This molding process combined with proper material permits the flow turners to be easily and inexpensively manufactured. Since there are no moving parts, the flow turners are more reliable and non-corroding. Additionally, this material slides easily along the belt, facilitating movement of the belt and avoiding damage to the belt.

The leaf spring portion can have a coupling part wrapped about curved surface of the support rod. This curved coupling part can be secured to the support rod by a correspondingly curved plate secured by fasteners to the support rod. This arrangement stresses the leaf spring forcing the plow portion against the filter belt. Alternatively, the coupling end of the leaf spring portion can be molded with a nose or wedge shape which engages the support rod. The support rod would then receive and retain the nose or wedge shape by being in the form of a slotted pipe or shaped sheet metal.

The support rod can be mounted in bearings for rotation about its central longitudinal axis or about a rotational axis offset from its central longitudinal axis. A handle can extend radially from one end of the support rod to permit rotation of the rod, and thereby, of the flow deflectors. A suitable control means can be provided for varying the rotational position of the support rod, and thereby varying stressing of the leaf spring portions to adjust the forces biasing the plow portions against the filter belt. This control means can comprise a set screw, a spring, a counter weight arrangement, a rachet lock mechanism, or a fastening clamp. By using such control means, the stressing can be infinitely variable.

Additionally, the stressing of the flow turners of each row can be varied by adjusting the coupling to the support rod. This will permit greater force at the filter belt lateral edges where solid materials tend to build up.

Preferably, the plow portions have the general configuration of cultivator plows, having a front surface tapering in a direction in opposition to the suspension flow and having a recessed rear surface. The tapered front surface assists in deflecting the flow of the suspension, while minimizing turbulence. The recessed rear surface of the plow portion provides a quiescent zone within the periphery of the plow portion and immediately therebehind where the water can collect over a portion of the filter belt which is free of the solid component and then drain through the belt. The bottom part of the plow portion is flared outwardly to make it self-sharpening, enhancing belt cleaning and drainage. The flared bottom also increases the contact area of the flow turner on the belt reducing wear on the filter belt. The unique shape permits the use of significantly less devices than conventional systems by having a wider effect on the slurry across the belt width.

The plow can be single sided or two sided. If single sided plows are used, one row of plows turns and moves the sludge blanket in one direction, and the following row moves the sludge blanket in the opposite direction. This requires left sided and right sided plows. If a two sided plow is used, all plows can be made of the same shape. Different types of slurries to be treated may require different designs, depending on the application and characteristic of the material dewatered. The plow portion can be shaped on its lateral sides to enhance turning of the suspension or solids component of the suspension. Plow shares extending laterally from the plow body provide a lifting action further enhancing the turning of the material. One or more plow shares (colters, plow blades) on top of each other are longitudinally raised and curved at a progressive radius in longitudinal and vertical directions. The bottom part of the slurry moves upwardly, while the top layer containing a greater amount of free draining liquid is moved downwardly, such that the flow is not merely separated as with conventional upright, elongated members of generally cylindrical or wedge shape, but the slurry follows a generally helical path as it passes over the plow portion surface. In this manner the position of the less dense slurry is exchanged with that of the more dense slurry.

The plow portion can be designed such that its upper part above the slurry is stiffer than its lower part in the slurry. This can be accomplished by several methods. The upper part can be made of stiffer, harder or less flexible material than the bottom part carrying the plow shares. The wall thickness of the upper portion can be larger then the bottom portion, or a "default" line or groove on the inside of the plow can generally follow the uppermost contour of the curved outward plow share and be molded into the plow making the bottom portion more flexible. This provides the flexibility and deformation required to allow movement of the plow shares in all directions adapting to irregularities in the sludge blanket and filter belt, and permits movement in a longitudinal direction for cleaning or adjustment of the downward force, without affecting the leaf spring and upper portion of the plow.

Other advantages and salient features of the present invention will become apparent from the following detailed description, which, taken in conjunction with the annexed drawings, discloses preferred embodiments of the present invention.

DETAILED DESCRIPTION OF PREFERRED EMBODIMENTS

Referring initially to FIGS. 1-4, the present invention relates to a chicane system of a belt filter or belt filter press having a gravity drainage zone 20 for separating the liquid component from the solid component of a suspension or slurry, e.g., sewage sludge. Gravity draining zone 20 comprises a rigid support including side supports 22 and 24 and a base plate 26. Base plate 26 has a plurality of holes 28 through which liquid may pass to a trough 30. Trough 30 conveys the liquid to a suitable discharge point.

A moveable filter belt 32 is moved by a suitable and conventional drive mechanism in the direction indicated by arrow 34 over base plate 26. Lateral retaining walls 35 are spaced inwardly from side supports 22 and 24 and are located over the lateral sides of the filter belt. Seals 35a depend from the retaining walls and engage the upper surface of the filter belt such that the slurry is laterally retained on the filter belt by retaining walls 35 and seals 35a. Adjacent an inlet end of the filter belt, a distributor 36 is located over the belt for evenly distributing a suspension onto the filter belt.

Chicane system 38 comprises a support rod 40 and a plurality of flow turners 42. Flow turners 42 depend from the support rod and are spaced along the longitudinal axis of the support rod. Additionally, the flow turners engage the filter belt to prevent clogging of the filter belt by the solid component of the suspension. Support rod 40 is generally cylindrical and has a central longitudinal axis extending perpendicular to the flow direction of the suspension and the movement of filter belt 32 indicated by the arrow 34.

Each flow turner 42 comprises a plow portion 44 and a cantilever or leaf spring portion 46. The wording "cantilever or leaf spring" means an elongated member fixed at one end and exerting a force near or at its other end. The leaf spring portion 46 is fixed at one end to support rod 40 and is fixed at an opposite end to plow portion 44. Each leaf spring portion is stressed in a manner biasing and forcing the respective plow portion 44 against filter belt 32 such that the plow portion will extend into and through the suspension and directly and positively engage the filter belt. Upward movement, if any, of the plow portion would cause an increase in the force exerted by the leaf spring portion to move the plow portion back against the filter belt. The flow turners maintain contact with the filter belt, essentially continuously, even upon encountering an obstruction.

Figure 5:
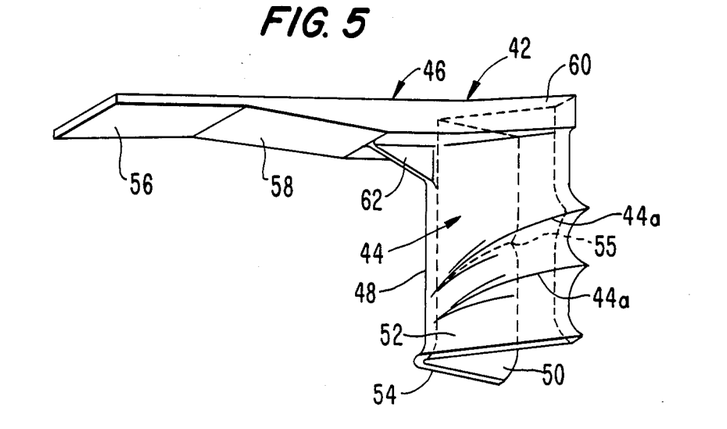
FIG. 5 is an enlarged, perspective view of the flow turner of FIG. 1.

The details of each flow turner are more clearly illustrated in the enlarged view of FIG. 5. As illustrated therein, each plow portion 44 is formed as a unitary, one piece structure with the respective leaf spring portion in that the flow turner is unitarily molded of a flexible, elastic, abrasion resistant synthetic plastic. This plastic is preferably polyurethane. The leaf spring portion can be reinforced by metal, fiberglass or other reinforcements, or can be hollow and filled with water, gas or other medium to affect its operation.

Plow portion 44, is essentially in the shape of a cultivator plow tapering in a direction opposite to the suspension flow and having laterally extending plow shares 44a. The forward part 48 is rounded and curved to avoid a build up of fibers and to generate an upward flow of sludge. The central portion of plow portion 44 is hollow and is open in a rearward or down stream direction to provide a recessed rear surface 50. The bottom portion 52 flares outwardly and terminates in a flat, planar bottom surface 54 for riding on the filter belt such that the edges of surface 54 are self-sharpening. Bottom surface 54 is generally V-shaped or U-shaped. The cross-sectional configuration of the plow portion in planes parallel to the filter belt is generally V-shaped, but varies in a vertical direction perpendicular to the filter belt. The wall thickness of the plow portion is reduced at internal groove 55 to increase the flexibility of the plow portion in a vertical direction (see FIG. 4). Groove 55 provides flexibility in a vertical direction by permitting the part of the plow portion below groove 55 to flare outwardly upon encountering an obstruction 32a, as shown for the right-hand flow turner in FIG. 4, or during the cleaning operation.

Figure 1:
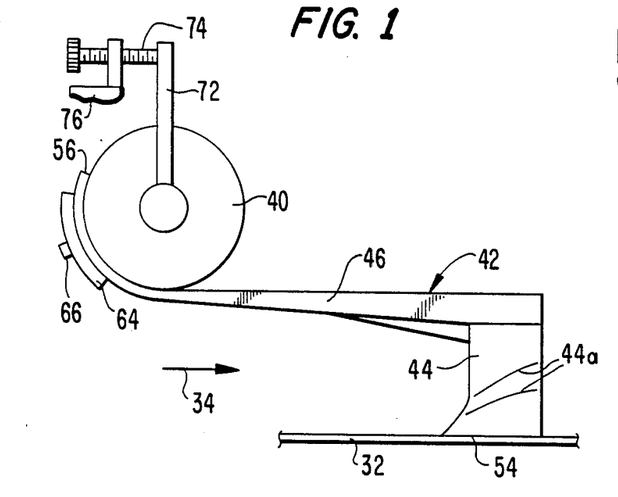
FIG. 1 is a partial side elevational view of a chicane system for a filter press according to a first embodiment of the present invention, with the flow turner in a normal operating position.

Leaf spring portion 46 comprises a coupling part 56 located adjacent the end thereof remote from plow portion 44. Coupling part 56 is in the shape of a rectangular parallelipiped and is adapted to be curved in order that it can be wrapped around a portion of the cylindrical surface of support rod 40, as illustrated in FIG. 1.

From coupling part 56, in a direction toward plow portion 44, leaf spring portion 46 comprises a middle part 58 which increases in thickness, but decreases in width in a direction toward plow portion 44. An end part 60 of the leaf spring portion forms the uppermost section of plow portion 44. A reinforcing fin 62 couples the under surface of middle part 58 to forward part 48.

Referring again to FIGS. 1 and 2, coupling part 56 of leaf spring portion 46 is attached to an arcuately curved portion of support rod 40 by a correspondingly curved plate 64. The curved plate is attached to support rod 40 by threaded bolts 66 which engage correspondingly threaded bores in or attached to support rod 40. The bending of leaf spring portion coupling part 56 causes some stressing of the leaf spring portion. This stressing tends to bias or force plow portion 44 downwardly such that its bottom surface 54 is forced against filter belt 32. However, the resiliency of the material used to form the flow turner and the formation of groove 55 in plow portion 44 permits the plow portion to bend readily, permitting plow portion 44 to move laterally, upwardly and downwardly in response to suspension flow conditions and irregularities on filter belt 32, allowing obstructions such as compressed sludge particles and fiber bundles to pass. This reduces the need for cleaning. In this manner, the downward force applied by the plow portion provides a clean area free of the solid component within and adjacent recessed rear surface 50 of the plow portion, while having adequate resiliency to avoid damaging the filter belt. Additionally, the plastic material and the flat bottom surface 44 provide a relatively low frictional contact with the belt so as not to unduly impede its movement.

Figure 2:
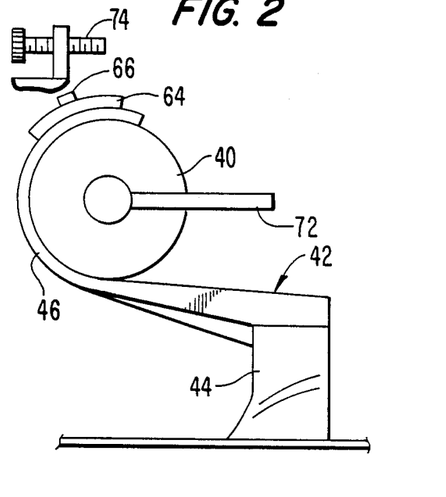
FIG. 2 is a partial side elevational view of the chicane system in FIG. 1, with the flow turners in an upstream position for the cleaning operation.
Figure 3:
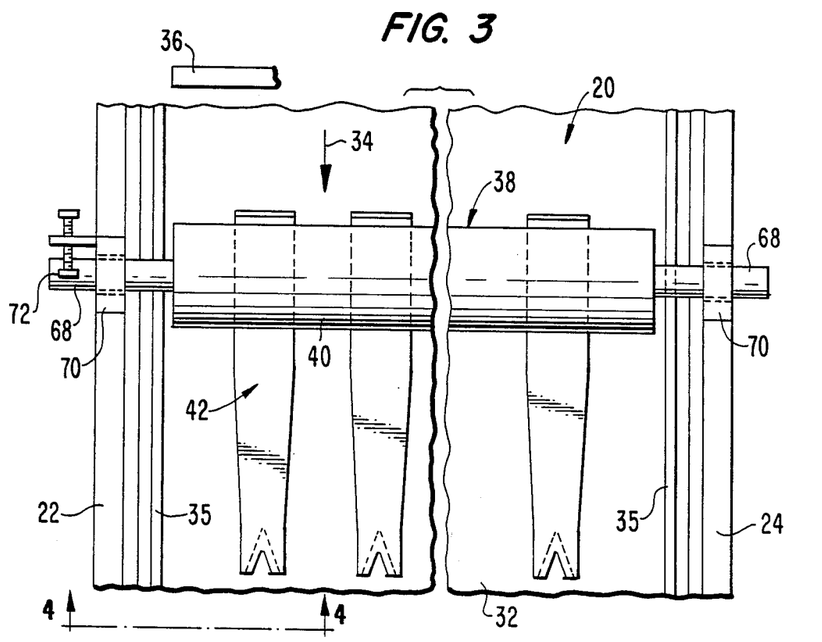
FIG. 3 is a partial top plan view of the chicane system of FIG. 1.

Support rod 40 has reduced diameter ends 68 rotatably mounted in bearings 70. Bearings 70 are fixedly mounted on side supports 22 and 24. The connection between rod end 68 and bearings 70 permits support rod 40 to rotate about its central, longitudinal axis.

One of the rod ends 68 includes a handle 72 extending radially relative to the longitudinal axis of support rod 40. The handle has one end fixed to the rod end such that the handle and the support rod are fixed for simultaneous rotation.

Rotation of the handle and the support rod between the positions illustrated in FIGS. 1 and 2 cause movement of each plow portion in upstream and downstream directions relative to the flow. When this upstream-downstream movement is repeated several times, material which has built up on the plow portions is broken loose and permitted to flow downstream. In this manner, the plows are cleaned without being raised or removed from the slurry. Since the flow turners need not be raised, less clearance is required over the gravity drainage zone. The reduced clearance requirement permits predewatering equipment mounted over the gravity zone to be lower, reducing the overall height of the equipment.

When the support rod is rotated clockwise from the position of FIG. 1 to the position of FIG. 2, the leaf spring portion is wrapped further about the support rod, drawing the plow portion upstream and compressing slightly the plow portion. Returning the handle to the FIG. 1 position will push the plow portion back to its original, operating downstream position and allow the plow portion to expand vertically.

Large pieces of debris are trapped by the plow portions and retained in the gravity drainage zone for removal by the operator. This prevents the large debris from entering and damaging downstream portions of the equipment.

The rotational position of support rod 40 can be varied and set in different positions, during operation, to vary the stressing of leaf spring portions 46 by transferring a moment from the support rod to the plow portions. Changing the stressing of the leaf spring portions adjusts the forces biasing plow portions 44 against filter belt 32. The further support rod 40 is rotated in a clockwise direction, as illustrated in FIG. 1, the greater the stressing and the greater the force pushing plow portion 44 against belt 32. If the support rod is moved to a setting in a counter clockwise direction, the stressing and forces are decreased.

In the first embodiment of FIGS. 1-4, the mechanism for controlling the rotational position of support rod 40 comprises a set screw 74 threadedly mounted in a support 76. Support 76 is fixedly attached to side support 22. An end of set screw 74 engages a free end of handle 72. The more set screw 74 extends through support 76, the further support rod 40 is rotated clockwise to increase the stressing, of the leaf spring portions of the flow turners. If the set screw is moved to the left as illustrated in FIG. 1, support rod 40 will be caused to rotate counter clockwise as a result of the leaf spring portion stressing, thereby alleviating the pre-set force of the plow portion against filter belt 32. Thus, by varying the position of set screw 74 within support 76, the pressure exerted by plow portion 44 against filter belt 32 can be varied, as desired.

Figure 3A:
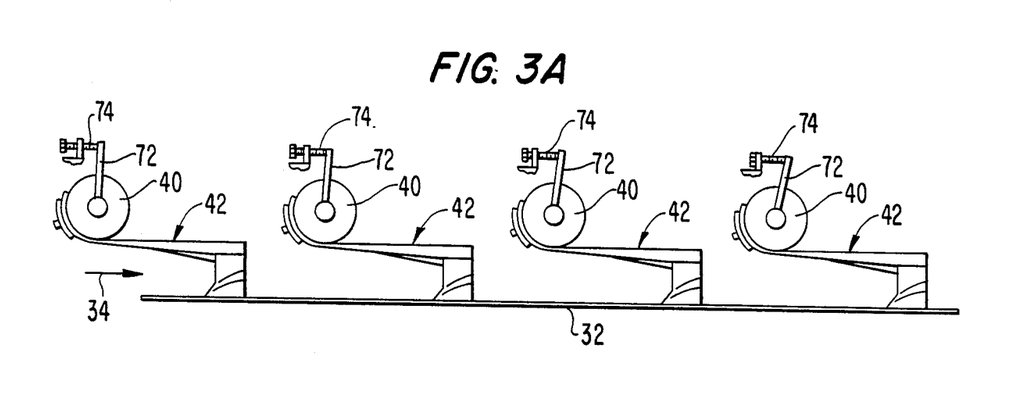
FIG. 3A is a partial side elevational view of the chicane system of FIG. 1 illustrating a plurality of rows of flow turners.
Figure 4:
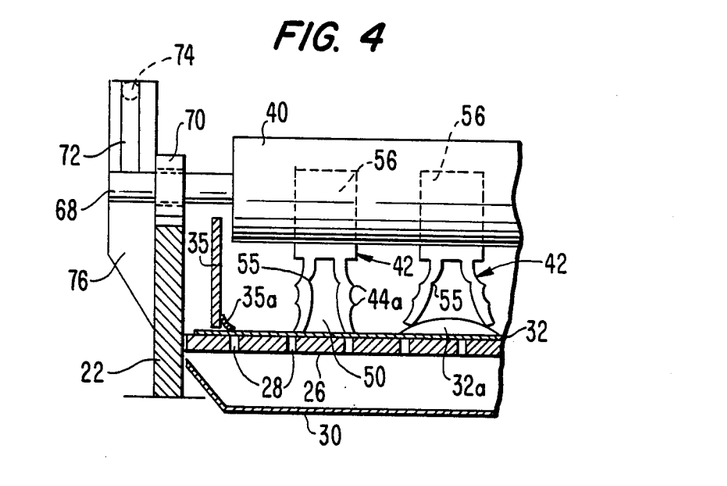
FIG. 4 is a partial rear elevational view taken along lines 4—4 of FIG. 3.

As illustrated in FIG. 3A, the flow turners should be variously stressed such that the flow turners are biased downwardly against the belt with increasing forces in the flow direction 34. Flow turners 42 are stressed to a greater extent in the direction of arrow 34 by the different settings of screw 74 and handle 72. This will optimize the system along the gravity section and compensate for the increasing slurry viscosity and density in the flow direction.

Figure 6:
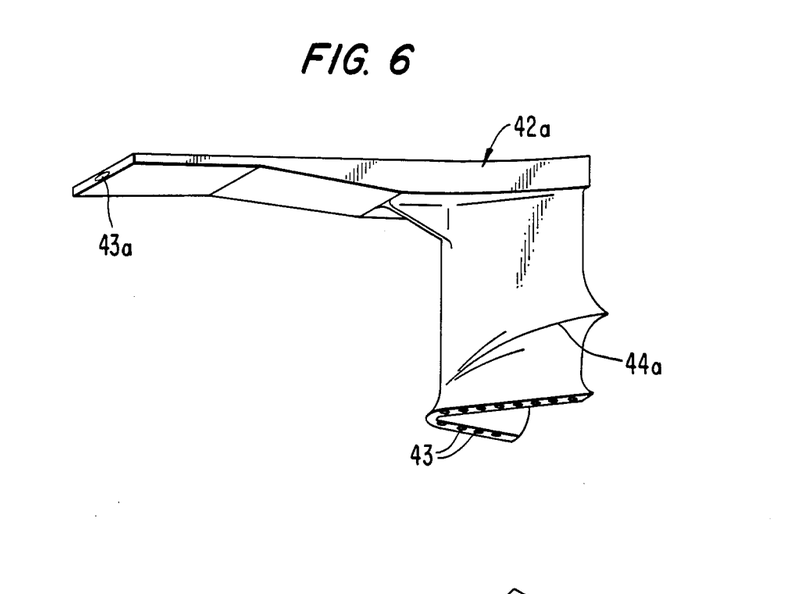
FIG. 6 is an enlarged perspective view of a flow turner according to another embodiment of the present invention.
Figure 7:
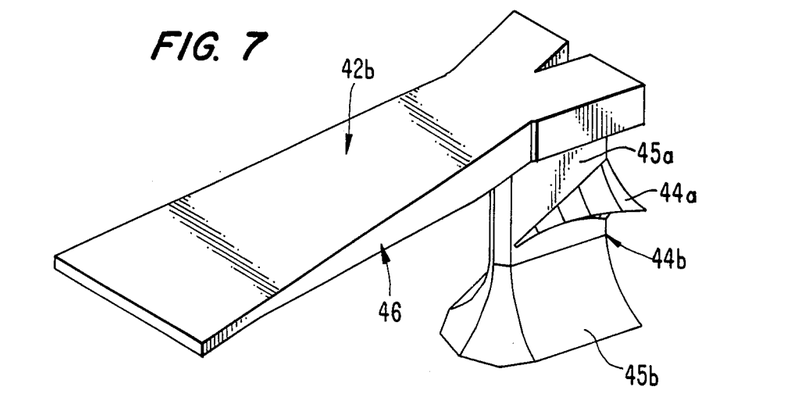
FIG. 7 is an enlarged perspective view of a flow turner according to a further embodiment of the present invention.

FIGS. 6 and 7 illustrate different forms for the flow turner. Flow turner 42a differs from that of FIG. 5 in that it only has one plow share 44a. Additionally, flow turner 42a has vertical conduits 43 through its plow portion and a horizontal conduit 43a through its leaf spring portion. Conduits 43 and 43a are joined at the top of the plow portion. By coupling a hose to the free end of conduit 43a, a cleaning fluid (e.g., water) can be conveyed under pressure through the flow turner and against the filter belt to clean the filter belt. The scraping action of the flow turners will only scrape the solid material off the top of the belt, but will not remove the solid material entrapped within the concavities of a porous belt. The cleaning fluid will also remove the entrapped solid material. The remainder of plow turner 42a is essentially identical to that of flow turner 42.

Flow turner 42b illustrated in FIG. 7 differs from that of FIGS. 5 and 6 only in the form of its plow portion 44b. Its leaf spring portion 46b is essentially identical to that described above in connection with FIGS. 5 and 6. Plow portion 44b is divided into an upper section 45a and lower section 45b. The upper section has a laterally extending plow share 44a and is made of material which is more rigid and less flexible than that of the lower section 45b. The more flexible section 45b will flex to accommodate the plow portion to different stress settings and to permit lateral and vertical movement of the plow portion dependent upon flow conditions and belt conditions.

Figure 7A:
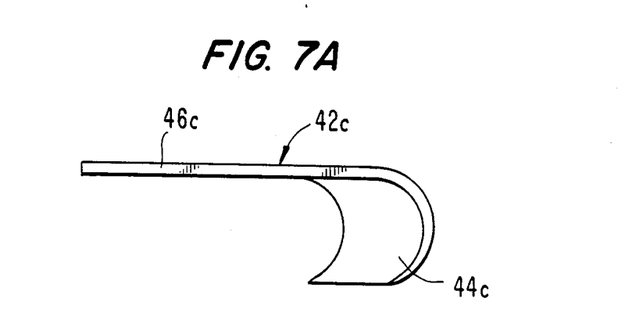
FIG. 7A is a side elevational view of a flow turner according to yet another embodiment of the present invention.

Alternatively, the plow portions can be formed, as illustrated in FIG. 7A, such that they only deflect the slurry flow to one lateral side in each row. Successive rows deflect the slurry in opposite directions. The flow turners 42c comprise a plow portion 44c and a leaf spring portion 46c. Plow portions 44c are generally in the form of semi-cylindrical surfaces oriented at acute angles to the slurry flow.

Figure 8:
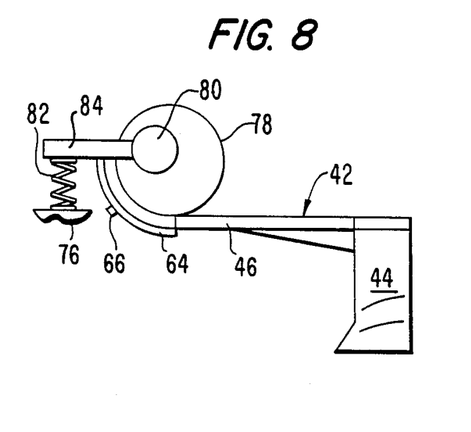
FIG. 8 is a partial side elevational view of a chicane system according to a second embodiment of the present invention.
Figure 9:
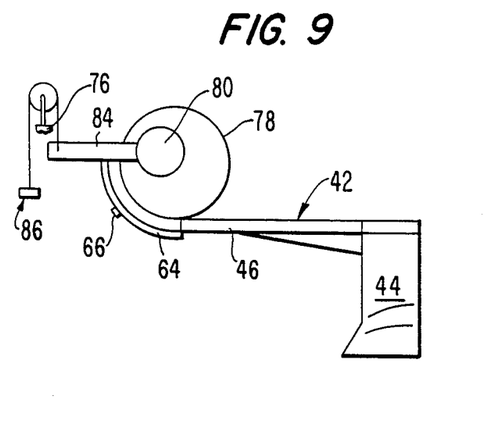
FIG. 9 is a partial side elevational view of a chicane system according to a third embodiment of the present invention.
Figure 10:
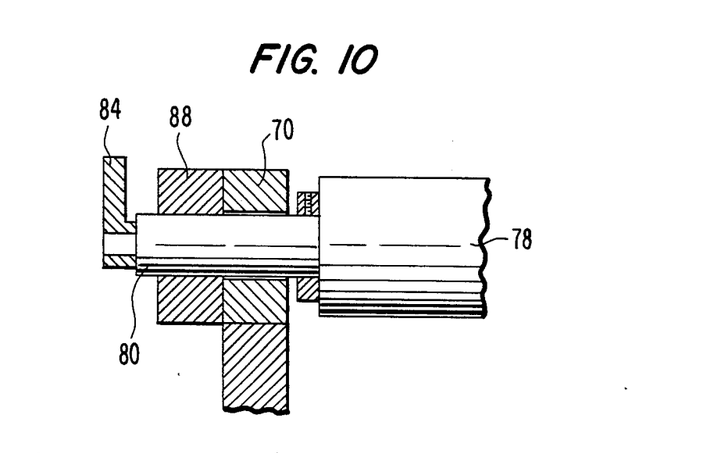
FIG. 10 is a partial front elevational view of a chicane system according to a fourth embodiment of the present invention.

FIGS. 8-10 each disclose different arrangements for controlling the rotational position of the support rod and varying the stressing of the flow turner leaf spring portions. In these three embodiments, support rod 78 has rod ends 80. The rod ends and the support rod are each cylindrical. However, the longitudinal axes of the rod ends and of the support rod are laterally offset. With the rod ends located in bearings 70 of FIGS. 2 and 3, support rod 78 will be rotated about an axis laterally offset, and parallel to its longitudinal axis. This arrangement uses the cylindrical shape of support rod 78 as a cam to further increase the stressing of the leaf spring portions upon rotation of the support rod in a clockwise direction, as illustrated in FIGS. 8-10.

The features of the embodiments of FIGS. 8-10 which are similar to those of the first embodiment of FIGS. 1-4 are identified with like reference numbers.

In FIG. 8, a tension spring 82 is mounted on support 76 and engages a free end of handle 84. Handle 84 is oriented at a 90° angle relative to the orientation of the handle in FIG. 1. Spring 82 biases support rod 78 for rotation in a clockwise direction tending to increase the stressing of leaf spring portions 46. By varying the tension on spring 82, the stressing of the leaf spring portions can be varied.

In FIG. 9, a counter-weight mechanism 86 is mounted on support 76 and is coupled to the free end of handle 84. Counter-weight mechanism 86 tends to rotate support rod 78 in a clockwise direction increasing the stressing of leaf spring portion 76 and increasing the force exerted by plow portion 44 on filter belt 32. By varying the amount of weight of the counter-weight mechanism 86, the rotational position of support rod 78 and the stressing of leaf spring portions 46 can be varied.

In FIG. 10, a rachet look mechanism 88 is mounted on one end 80 of support rod 78 and is secured to bearing 70. The details of the rachet lock mechanism are generally conventional. The engagement between the rachet lock mechanism 88 and rod end 80 permits the handle, and thereby support rod 78, to be moved to and set in positions in relatively clockwise or counter clockwise directions. The more clockwise the rotation, the greater the stressing of leaf spring portions 46. The positioning in the counter clockwise direction decreases the stressing on leaf spring portions 46.

FIGS. 11-15 each disclose different configurations of the support rod and of the mechanism for coupling each flow turner to the support rod. The flow turners in these embodiments differ only in the form of the coupling part of the leaf spring portion. The remainder of the plow portion can be formed according to FIGS. 5, 6 or 7.

Figure 11:
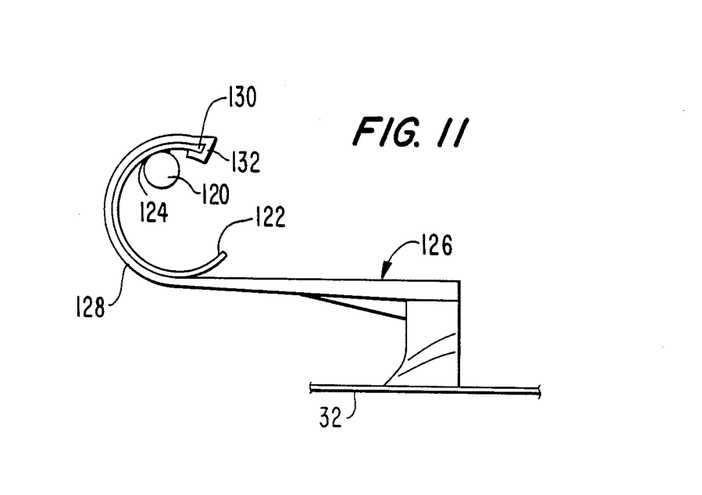
FIG. 11 is a partial side elevational view of a chicane system according to a fifth embodiment of the present invention.

In the embodiment of FIG. 11, the support rod comprises a relatively small diameter central rod 120 and a partially cylindrical, generally C-shaped member 122. Rod 120 is fixed to an inner surface of member 122 adjacent its upper end by fastening means 124 such as welds. This arrangement of rod 120 and member 122 offsets the rotational and longitudinal axes of the support rod to provide the camming action discussed above in connection with FIGS. 8-10. Flow turner 126 of this embodiment comprises an elongated coupling part 128 extending around to upper end 130 of member 122. The upper end is widened to have an increased thickness relative to the remainder of member 122. The free end 132 of coupling part 128 is formed into a U-shape corresponding coupling part 128 is formed into a upper end 130. The coupling of upper end 130 and free end 132 positively couples flow turner 126 to the support rod 120 and 122.

Figure 12:
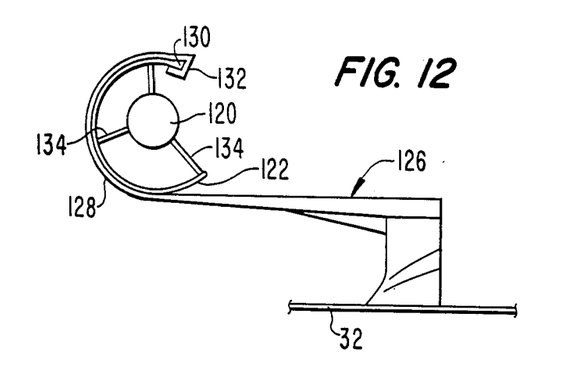
FIG. 12 is a partial side elevational view of a chicane system according to a sixth embodiment of the present invention.

FIG. 12 differs from the embodiment of FIG. 11 solely in the coupling of rod 120 to C-shaped member 122. In FIG. 12, rod 120 is spaced from and attached to C-shaped member 122 by spokes 134. This concentrically locates the rotational axis and the central axis or axis of curvature of C-shaped member 122. This arrangement can also be eccentric.

Figure 13:
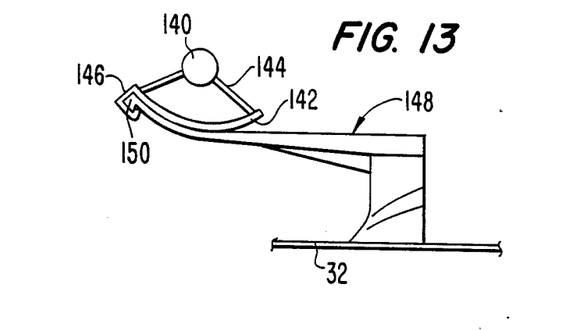
FIG. 13 is a partial side elevational view of a chicane system according to a seventh embodiment of the present invention.

In the embodiment of FIG. 13, the support rod is formed by a central rod 140 and a curved member 142. Rod 140 and member 142 are attached by spokes 144 such that the central axis of rod 140 is generally coextensive with the axis of curvature of curve member 142. An attachment end 146 of curved member 142 is bent in a U-shape with a constricted opening. The flow turner 148 has an enlargement 150 on the free end of its leaf spring portion. The shape of enlargement 150 corresponds to the configuration of attachment end 146 such that the leaf spring portion is secured to curved member 142. A section of the leaf spring portion follows and lies along the outside surface of curved member 142 to stress the flow turner. Rotation of rod 140 and curved member 142 in a clockwise direction will increase the stressing of the leaf spring portion and the force the plow portion exerts on filter belt 32.

Figure 14:
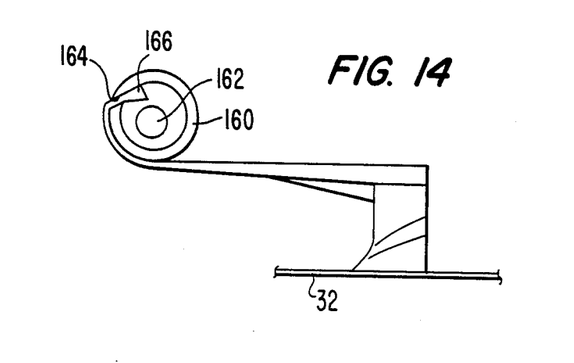
FIG. 14 is a partial side elevational view of a chicane system according to an eighth embodiment of the present invention.

In the embodiment of FIG. 14, the support rod comprises an outer cylindrical member 160 and a central rod 162. The longitudinal axes of the cylindrical member and the central rod are laterally offset to provide a camming effect upon rotation of the support rod 160 and 162. Cylindrical member 160 is provided with an opening 164 which extends radially through the member. The free end of the leaf spring portion extends through opening 164 such that an enlargement 166 on the free end of the leaf spring portion will become entrapped within the interior of cylindrical member 160. From enlargement 166, the leaf spring portion extends through opening 164 and about an outer peripherial curved surface portion of outer cylindrical member 160.

Figure 15:
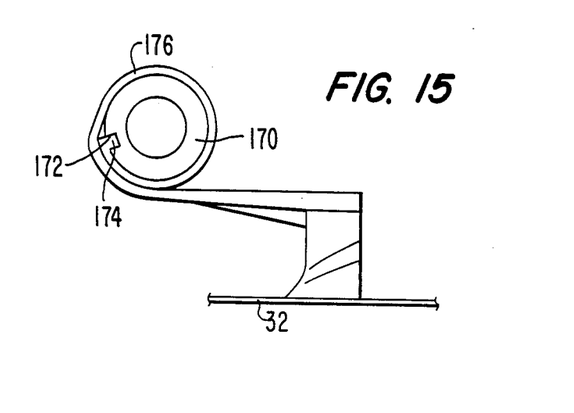
FIG. 15 is a partial side elevational view of a chicane system according to a ninth embodiment of the present invention.

In the embodiment of FIG. 15, support rod 170 comprises a cylindrical member having a recess formed in its outer surface which opens in a radially outward direction. An enlargement 174 on a free end of the leaf spring portion is fixed within recess 172. The coupling part 176 of the flow turner is extended or elongated and is wrapped completely about support rod 170 such that a portion of the coupling part overlaps and extends over enlargement 174 retaining enlargement 174 within recess 172. This arrangement increases the downward biasing force on the plow portion against filter belt 32, as well as providing a secure attachment of the flow turner to the support rod.

Although the invention has been described in considerable detail, with particular reference to certain preferred embodiments thereof, variations and modifications can be effected within the scope and spirit of the invention as defined in the appended claims.

We claim:

1. A chicane system for a belt filter, comprising:
   a gravity drainage zone having a movable filter conveyor belt, inlet means for distributing a suspension on said filter belt and outlet means for discharging separated liquid and solid components of the suspension;
   a support rod mounted over said filter belt and having a longitudinal axis generally perpendicular to filter belt movement; and
   a plurality of flow turners depending from said support rod and engaging said filter belt to prevent clogging of said filter belt by solid components of the suspension, each of said flow turners including a plow portion to extend into the suspension engaging said filter belt and a leaf spring portion fixed at a first end to said support rod and at an opposite second end to said plow portion, each said leaf spring portion including coupling means for stressing each said leaf spring portion and for biasing and forcing the respective plow portion against said filter belt during operation.

2. A chicane system according to claim 1 wherein each said plow portion comprises suspension turning means for causing the suspension to flow along a generally helical path upon contacting each said plow portion.

3. A chicane system according to claim 2 wherein said suspension turning means comprise at least one plow share extending laterally from each said plow portion.

4. A chicane system according to claim 3 wherein each said plow share increases in width and height in a direction of suspension flow.

5. A chicane system according to claim 1 wherein each said plow portion is formed as a unitary one-piece structure with the respective leaf spring portion.

6. A chicane system according to claim 5 wherein each said flow turner is unitarily molded of flexible plastic.

7. A chicane system according to claim 6 wherein said plastic is polyurethane.

8. A chicane system according to claim 1 wherein each said coupling means comprises a coupling part adjacent said first end thereof wrapped about curved surface section of said support rod.

9. A chicane system according claim 8 wherein said coupling part is attached to said support rod by an overlying, correspondingly curved plate.

10. A chicane system according to claim 9 wherein said curved plate is attached by fasteners to said support rod.

11. A chicane system according to claim 1 wherein said support rod is mounted in bearing means for rotation about said longitudinal axis of said support rod.

12. A chicane system according to claim 11 wherein said support rod comprises a handle extending radially therefrom adjacent one end thereof, said handle being fixed to said support rod for simultaneous rotation therewith.

13. A chicane system according to claim 12 wherein said handle is coupled to control means for varying rotational positions of said support rod, and thereby varying stressing of said leaf spring portions to adjust forces biasing said plow portions against said filter belt.

14. A chicane system according to claim 13 wherein said control means comprises a set screw.

15. A chicane system according to claim 14 wherein said set screw engages a free end portion of said handle.

16. A chicane system according to claim wherein said control means comprises a spring applying forces tending to rotate said support rod in a direction forcing said plow portions against said filter belt.

17. A chicane system according to claim 13 wherein said control means comprises a counter weight applying forces tending to rotate said support rod in a direction forcing said plow portions against said filter belt.

18. A chicane system according to claim 13 wherein said control means comprises rachet lock means for retaining said support rod in various, pre-set rotational positions.

19. A chicane system according to claim 13 wherein said control means is variable.

20. A chicane system according to claim 13 wherein said control means includes means for varying during operation.

21. A chicane system according to claim 13 wherein a plurality of support rods with depending flow turners and with control means are spaced along a length of said gravity drainage zone, the control means for the support rods being differently set such that the forces biasing said plow portions against said filter belt progressively increase in a downstream direction.

22. A chicane system according to claim 1 wherein said support rod is generally cylindrical, said support rod being mounted in bearing means for rotation about a rotational axis laterally offset and parallel to said longitudinal axis.

23. A chicane system according to claim 1 wherein said plow portions are generally tapered in opposition to suspension flow and comprise recessed rear surfaces.

24. A chicane system according to claim 1 wherein each said plow portion comprises upper and lower sections, said lower sections being more flexible than said upper sections.

25. A chicane system according to claim 24 wherein said upper and lower sections are formed with different a flexibility characteristics during molding.

26. A chicane system according to claim 24 wherein each said lower section has a wall thickness less than that of the respective upper section.

27. A chicane system according to claim 24 wherein said upper and lower sections are separated by grooves forming plow portion sections of reduced thickness.

28. A chicane system according to claim 1 wherein said plow portions comprise bottom sections with self-sharpening edges engaging said filter belt.

29. A chicane system according to claim 1 wherein said leaf spring portions comprise means for maintaining essentially continuous contact between said plow portions and said filter belt, preventing large objects from moving downstream.

30. A chicane system according to claim 1 wherein said flow turners comprise internal conduits for conveying a cleaning fluid against said filter belt.

31. A chicane system according to claim 1 wherein said support rod comprises a laterally open, curved member, said first end of each said leaf spring portion being attached to one edge of said curved member.

32. A chicane system according to claim 31 wherein said first end of each said leaf spring portion comprises a bent end extending around and gripping said one edge of said curved member.

33. A chicane system according to claim 32 wherein said one edge of said curved member comprises an enlargement received within said bent end of each said leaf spring portion.

34. A chicane system according to claim 31 wherein said first end of each said leaf spring portion comprises an enlargement received in a bent end of said curved member.

35. A chicane system according to claim 1 wherein said support rod comprises an opening in which said first end of each said leaf spring portion is secured.

36. A chicane system according to claim 35 wherein each said first end comprises an enlargement force fit through said opening.

37. A chicane system according to claim 35 wherein each said first end comprises an enlargement received in said opening and a coupling part wound completely about the support rod overlapping said enlargement.

38. A method of cleaning a chicane system for a filter belt during operation, comprising the steps of:

rotating a support rod mounted over a filter belt in a first direction to wind flexible leaf spring portions of flow turners about the support rod and to move plow portions of the flow turners depending from free ends of the leaf spring portions in an upstream direction toward the support rod in opposition to slurry flow, while maintaining contact between the plow portions and the filter belt; and rotating the support rod in a second direction, opposite to the first direction, to partially unwind the leaf spring portions from about the support rod and to move the plow portions back downstream with slurry flow, while maintaining contact between the plow portions and the filter belt.

39. A method according to claim 38 wherein rotations in the first and second directions are repeated several times loosening debris attached to the plow portions.

* * * * *